United States Patent [19]
Corriveau et al.

[11] Patent Number: 6,097,962
[45] Date of Patent: Aug. 1, 2000

[54] METHOD OF HANDLING SHORT MESSAGE SERVICE ACKNOWLEDGEMENT MESSAGES BETWEEN COOPERATING MOBILE SWITCHING CENTERS IN A RADIO TELECOMMUNICATIONS NETWORK

[75] Inventors: Michel Corriveau, St-Hubert; Jean-Pierre Brochu, Montreal; Jacques Raynauld, Montreal; Donald Joong, Montreal, all of Canada

[73] Assignee: Telefonaktiebolaget LM Ericsson (publ), Stockholm, Sweden

[21] Appl. No.: 09/078,903

[22] Filed: May 13, 1998

Related U.S. Application Data

[60] Provisional application No. 60/061,242, Oct. 7, 1997, and provisional application No. 60/061,243, Oct. 7, 1997.

[51] Int. Cl.[7] .................................................. H04Q 7/20
[52] U.S. Cl. ........................ 455/466; 455/432; 455/445
[58] Field of Search ..................................... 455/466, 412, 455/403, 560, 432, 445

[56] References Cited

U.S. PATENT DOCUMENTS

| | | | |
|---|---|---|---|
| 5,577,102 | 11/1996 | Koivunen | 379/59 |
| 5,761,623 | 6/1998 | Lupien et al. | 455/552 |
| 5,768,509 | 6/1998 | Gunluk | 455/428 |
| 5,839,070 | 11/1998 | Lupien et al. | 455/440 |
| 5,857,153 | 1/1999 | Lupien et al. | 455/422 |
| 5,884,175 | 3/1999 | Schiefer et al. | 455/436 |
| 5,903,840 | 5/1999 | Bertacchi | 455/436 |
| 5,915,220 | 6/1999 | Chelliah | 455/435 |
| 5,915,222 | 6/1999 | Olsson et al. | 455/466 |
| 5,960,356 | 9/1999 | Alpevorich et al. | 455/458 |

FOREIGN PATENT DOCUMENTS

WO 95/12933  5/1995  WIPO.

OTHER PUBLICATIONS

Roch H. Glitho; "Use of SS7 in D–AMPS–Based PCS: Orthodoxy vs. Heterodoxy"; IEEE Personal Communications; vol. 4, No. 3, Jun. 1997, pp. 15–23.

Primary Examiner—William G. Trost
Assistant Examiner—Sonny Trinh
Attorney, Agent, or Firm—Smith & Danamraj, PC

[57] ABSTRACT

A method of handling SMS messages in a radio telecommunications network when an originating mobile station-based Short Message Entity (MS-SME) sends a SMS origination message while operating in a first Mobile Switching Center (MSC) and then moves into a second MSC before the MS-SME receives a SMS acknowledgement message. The method begins by including a R_Transaction ID parameter in the SMS origination message sent over the Digital Traffic Channel (DTC) from the originating MS-SME to the first MSC. If the MS-SME moved back to an anchor MSC, a SMS_Transaction ID (SMSTID) parameter is included in an ANSI-41 SMS Delivery Backward (SMDBACK) Invoke message sent from the first MSC to the anchor MSC. The SMSTID parameter utilizes information from the R_Transaction ID parameter to enable the MS-SME to correlate a SMS acknowledgement message with the SME origination message. If the MS-SME moved to a new serving MSC, the SMSTID parameter is placed in a SMS Delivery Point-to-Point Acknowledgement (SMDPPACK) Invoke message, and sent from the anchor MSC to the new serving MSC. The information in the SMSTID parameter is used by the second MSC to send a SMS acknowledgement message to the originating MS-SME.

22 Claims, 8 Drawing Sheets

FIG. 5

| SMS Delivery Backward INVOKE Parameters | | | | Timer: SBT |
|---|---|---|---|---|
| Field | Value | Type | Reference | Notes |
| Identifier | SET [NATIONAL 18] | M | 6.3.2.1 | |
| Length | variable octets | M | 6.3.2.1 | |
| Contents | | | | |
| Inter MSC Circuit ID | | M | 6.5.2.7.2 | |
| Mobile Identification Number | | M | 6.5.2.81 | a |
| SMS_Bearer Data | | M | 6.5.2.124 | |
| SMS_Teleservice Identifier | | M | 6.5.2.137 | |
| Electronic Serial Number | | O | 6.5.2.63 | b |
| SMS_Charge Indicator | | O | 6.5.2.126 | c |
| SMS_Destination Address | | O | 6.5.2.127 | d |
| SMS_Original Destination Address | | O | 6.5.2.131 | e |
| SMS_Original Destination Subaddress | | O | 6.5.2.132 | b |
| SMS_Original Originating Address | | O | 6.5.2.133 | f |
| SMS_Original Originating Subaddress | | O | 6.5.2.134 | b |
| SMS_Originating Address | | O | 6.5.2.135 | g |
| SMS_Transaction ID | | O | 6.5.2.x | h |

FIG. 6

| Field | Value | Type | Reference | Notes |
|---|---|---|---|---|
| Identifier | SMS_Transaction ID | O | 6.5.1.2 | |
| | IMPLICIT OCTET STRING | | | |
| Length | variable octets | O | 6.5.1.1 | |
| Contents | | | | |

| H | G | F | E | D | C | B | A | octet | Notes |
|---|---|---|---|---|---|---|---|---|---|
| SMS_Transaction ID | | | | | | | | 1 | a |
| ... | | | | | | | | | b |

FIG. 11

| SMS Delivery Point To Point Ack INVOKE Parameters | | | | |
|---|---|---|---|---|
| Field | Value | Type | Reference | Notes |
| Identifier | SET [NATIONAL 18] | M | 6.3.2.2 | |
| Length | variable octets | M | 6.3.2.2 | |
| Contents | | | | |
| Inter MSC Circuit ID | | M | 6.5.2.7.2. | |
| IMSI | | O | 6.5.2.bu | d |
| Mobile Identification Number | | O | 6.5.2.81 | d |
| SMS Bearer Data | | O | 6.5.2.124 | a |
| SMS Cause Code | | O | 6.5.2.125 | b |
| SMS Transaction ID | | O | 6.5.2.x | c |

METHOD OF HANDLING SHORT MESSAGE SERVICE ACKNOWLEDGEMENT MESSAGES BETWEEN COOPERATING MOBILE SWITCHING CENTERS IN A RADIO TELECOMMUNICATIONS NETWORK

This application claims benefit of provisional application 60/061,242, filed Oct. 7, 1997 and provisional application 60/061,243, field Oct. 7, 1997.

BACKGROUND OF THE INVENTION

1. Technical Field of the Invention

This invention relates to telecommunication systems and, more particularly, to a method of handling Short Message Service (SMS) acknowledgement messages between cooperating Mobile Switching Centers (MSCs) during a voice call involving handoff in a radio telecommunications network.

2. Description of Related Art

A Mobile Station-based Short Message Entity (MS-SME) is a mobile station that is capable of sending, receiving, and processing SMS messages. When a MS-SME originates a SMS message on a Digital Traffic Channel (DTC) while the MS-SME is in the service area of a first MSC, and the MS-SME then moves into the service area of a second MSC, the MS-SME cannot receive an acknowledgement of the SMS message. Existing telecommunication standards support only a static situation in which a MS-SME remains in the service area of one MSC from the time that the SMS origination is made until the MS-SME receives the SMS acknowledgement. The MSC can be either an anchor MSC where a voice trunk is first established for the MS-SME, or it can be a serving MSC where the MS-SME is currently operating. If the MS-SME makes a SMS origination on a DTC in an anchor MSC, the anchor MSC delivers the SMS message directly to a Message Center (MC). The anchor MSC then receives a SMS acknowledgement from the MC which is then delivered to the MS-SME.

If the MS-SME makes a SMS origination on a DTC in a serving MSC, the MS-SME must remain in the serving MSC until the SMS acknowledgement is received. The serving MSC forwards the SMS message to the anchor MSC. The anchor MSC delivers the SMS message to the MC and receives a SMS acknowledgement from the MC. The anchor MSC returns the acknowledgement to the serving MSC which, in turn, sends the SMS acknowledgement to the MS-SME.

However, during the time between the SMS origination on the DTC in the serving MSC, and receipt of the SMS acknowledgement at the MS-SME, the MS-SME may move from the serving MSC to another MSC. There is currently no method for delivering the acknowledgement to the MS-SME if the MS-SME changes MSCs during this time period. If the MS-SME does not receive an acknowledgement within a predetermined time period of its SMS origination (for example, 12.8 seconds in IS-136), the MS-SME may re-initiate another SMS origination message on the DTC. This unnecessarily utilizes network resources since it requires at least one additional ANSI-41 message between the anchor MSC and the new serving MSC, two ANSI-41 messages between the MS-SME's anchor MSC and the MC, and one IS-136 message between the MS-SME and the new serving MSC. Processing capacity is also needlessly utilized to process the repeated SMS message. Considerable bandwidth may be utilized since an SMS message may be up to 255 octets in length.

There are no known prior art teachings of a solution to the aforementioned deficiency and shortcoming such as that disclosed herein. In order to overcome the disadvantages of existing solutions, it would be advantageous to have a method of handling SMS acknowledgement messages that enables a MS-SME to receive an acknowledgement even if the MS-SME moves from one MSC to another after the SMS origination and before the acknowledgement is delivered. The present invention provides such a method.

SUMMARY OF THE INVENTION

In one aspect, the present invention is a method of handling Short Message Service (SMS) messages in a radio telecommunications network when an originating mobile station-based Short Message Entity (MS-SME) sends a SMS origination message while operating in a serving Mobile Switching Center (MSC) and then moves into an anchor MSC before the MS-SME receives a SMS acknowledgement message. The method begins by including a radio air interface SMS message-correlating parameter in an intersystem SMS delivery message sent from the serving MSC to the anchor MSC. When the anchor MSC receives an SMS acknowledgement message from a message center, the anchor MSC determines whether the MS-SME is in its service area. This is followed by sending the SMS acknowledgement message directly from the anchor MSC to the originating MS-SME over an air interface radio link, and including the radio air interface SMS message-correlating parameter. The SMS message-correlating parameter enables the MS-SME to correlate the SMS acknowledgement message with the SMS origination message.

In another aspect, the present invention is a method of handling SMS messages in a radio telecommunications network when an originating MS-SME sends a SMS origination message while operating in an initial serving MSC and then moves through a tandem MSC into an anchor MSC before the MS-SME receives a SMS acknowledgement message. The method begins by including a radio air interface SMS message-correlating parameter in an intersystem SMS delivery message sent from the initial serving MSC to the tandem MSC. The SMS message-correlating parameter is then included in an intersystem SMS delivery message sent from the tandem MSC to the anchor MSC. The SMS acknowledgement message is then sent directly from the anchor MSC to the originating MS-SME over the air interface Digital Traffic Channel (DTC). The originating MS-SME then utilizes the radio air interface SMS message-correlating parameter to correlate the SMS acknowledgement message with the SMS origination message.

In yet another aspect, the present invention is a method of delivering a SMS acknowledgement message to an originating MS-SME in a radio telecommunications network when the originating MS-SME sends a SMS origination message on a Digital Traffic Channel (DTC) while operating in an anchor MSC and then moves into a serving MSC before receiving the SMS acknowledgement message from the MC. The SMS origination message includes a radio air interface SMS message-correlating parameter. The method begins by obtaining, by the anchor MSC, the SMS acknowledgement message from the MC. The anchor MSC determines whether the MS-SME has moved to the serving MSC, and if so, includes the radio air interface SMS message-correlating parameter in an intersystem SMS acknowledgement delivery message sent from the anchor MSC to the serving MSC. This is followed by determining in the serving MSC that the MS-SME is operating in the serving MSC's service area. The SMS acknowledgement message, including the radio air interface SMS message-correlating parameter, is then sent directly from the serving MSC to the originating MS-SME over the DTC. The originating MS-SME then utilizes the radio air interface SMS message-correlating parameter to correlate the SMS acknowledgement message with the SMS origination message.

In one embodiment, the intersystem SMS acknowledgement delivery message sent from the anchor MSC to the serving MSC is a SMS Delivery Point-to-Point Acknowledgement (SMDPPACK) Invoke message, and the radio air interface SMS message-correlating parameter is a SMS_Transaction ID (SMSTID) parameter. When the MS-SME initiates a SMS origination in a serving MSC, the SMSTID parameter is added to a SMS Delivery Backward (SMDBACK) Invoke message sent from the serving MSC to the anchor MSC. The SMSTID parameter is included in the above messages as an optional parameter to enable the messages as an optional parameter to enable the MS-SME to correlate the SMS acknowledgement with the SM origination when the MS-SME has been handed off after the MS-SME initiated the SMS origination. Information for the SMSTID parameter is obtained from the R_Transaction ID parameter of the SMS origination message.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 5 is a table of parameters illustrating the parameters of a SMS Delivery Backward (SMDBACK) Invoke message modified in accordance with the teachings of the present invention;

FIG. 6 is a table illustrating the information bits in the SMS Transaction ID (SMSTID) parameter;

FIG. 11 is a table of parameters illustrating the parameters of the SMS Delivery Point-to-Point Acknowledgement (SMDPPACK) Invoke message according to the teachings of the present invention.

DETAILED DESCRIPTION OF EMBODIMENTS

Figure 1:
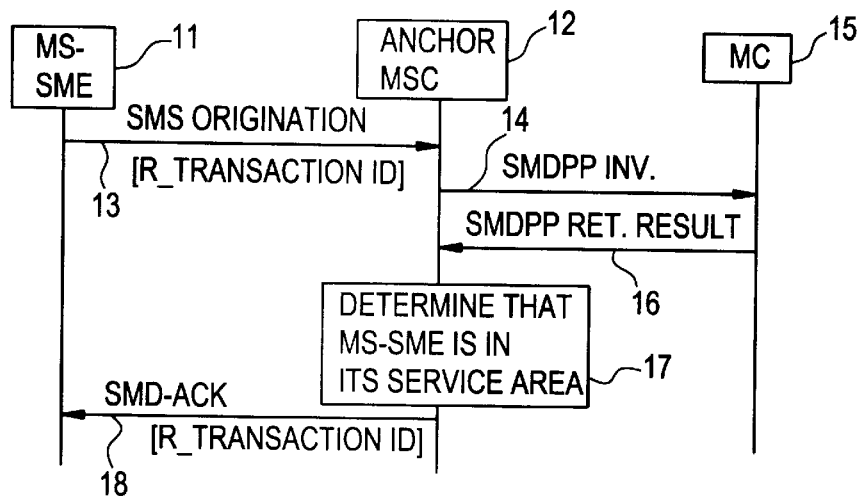
FIG. 1 (Pior Art) is a message flow diagram illustrating the existing flow of messages when a mobile station-based Short Message Entity (MS-SME) originates a Short Message Service (SMS) message while operating in an anchor MSC.

FIG. 1 is a message flow diagram illustrating the existing flow of messages when a Mobile Station-based Short Message Entity (MS-SME) 11 originates a Short Message Service (SMS) message while operating in an anchor MSC 12. The MS-SME first sends a SMS Origination message 13 over the IS-136 Digital Traffic Channel (DTC) via a base station (not shown) to the anchor MSC. The SMS Origination message includes a R_Transaction ID parameter which is a radio air interface SMS message-correlating parameter. The anchor MSC sends a SMS Delivery Point-to-Point (SMDPP) Invoke message 14 to a Message Center (MC) 15. The MC returns a SMDPP Return Result message 16 to the anchor MSC. The anchor MSC then determines at 17 whether the MS-SME 11 is in its service area. If so, the anchor MSC sends a SMS Delivery Acknowledgement (SMD-ACK) message 18 to the MS-SME 11. The SMD-ACK message includes the R_Transaction ID parameter which is utilized in the MS-SME to correlate the SMD-ACK message 18 with the SMS Origination message 13. The R_Transaction ID parameter is a mandatory parameter in IS-136 R-DATA Accept/R-DATA Reject messages. If the MS-SME 11 does not receive the SMD-ACK message 18 within a predetermined time period after sending the SMS Origination message 13, the MS-SME may send another SMS Origination message.

Figure 2:
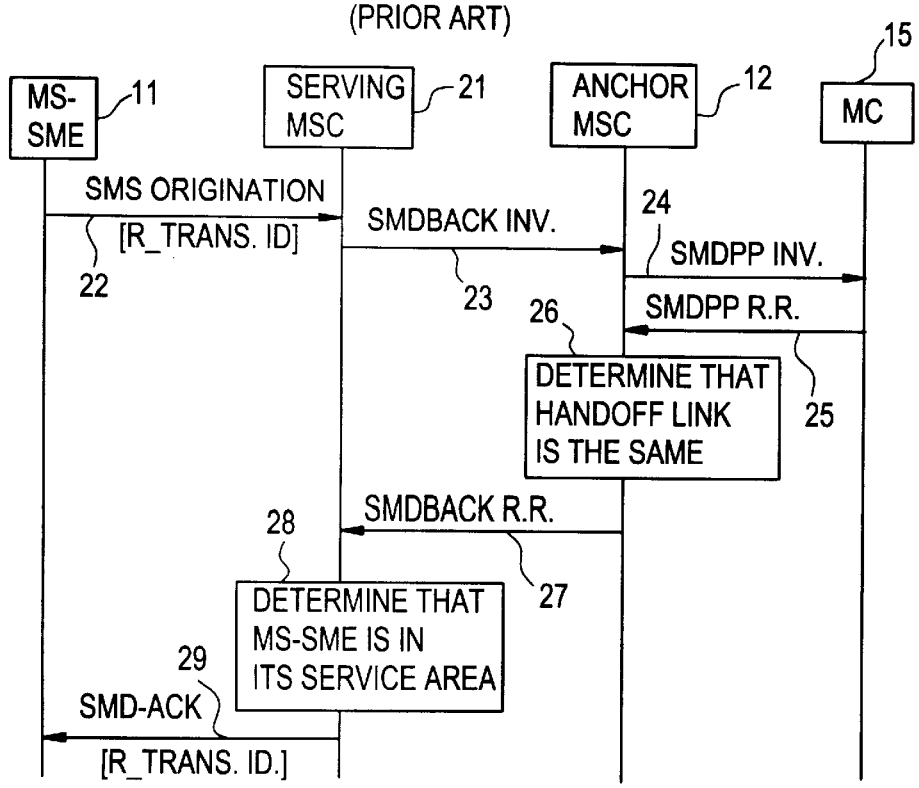
FIG. 2 (Prior Art) is a message flow diagram illustrating the existing flow of messages when a MS-SME originates a SMS message while operating in a serving MSC.

FIG. 2 is a message flow diagram illustrating the existing flow of messages when the MS-SME 11 originates a SMS message while operating in a serving MSC 21. The MS-SME first sends a SMS Origination message 22 over the IS-136 DTC to the serving MSC 21. The SMS Origination message includes the R_Transaction ID parameter. The serving MSC sends a SMS Delivery Backward (SMDBACK) Invoke message 23 to the anchor MSC 12 for the MS-SME. The anchor MSC sends a SMS Delivery Point-to-Point (SMDPP) Invoke message 24 to the MC 15, and the MC returns a SMDPP Return Result message 25 to the anchor MSC. The anchor MSC determines that the HO LINK is the same at 26, and then sends a SMDBACK Return Result message 27 to the serving MSC 21. The serving MSC determines at 28 whether the MS-SME 11 is in its service area. If so, the serving MSC sends a SMS Delivery Acknowledgement (SMD-ACK) message 29 to the MS-SME 11. The SMD-ACK message includes the R_Transaction ID parameter which is utilized in the MS-SME to correlate the SMD-ACK message 29 with the SMS Origination message 22. As noted above, if the MS-SME 11 does not receive the SMD-ACK message 29 within the predetermined time period after sending the SMS Origination message 22, the MS-SME may send another SMS Origination message.

The R_Transaction ID parameter is utilized by the MS-SME to correlate the SMS Origination message with the SMD-ACK message in a static scenario in which the MS-SME remains in the serving MSC from the time that the SMS Origination message is sent until the SMD-ACK message is received. The parameter is an air interface correlation parameter which specifically identifies a particular SMS message to the serving MSC at the air interface level, and it is not sent over the network. Therefore, only the serving MSC knows this parameter. If the MS-SME returns to the anchor MSC, the anchor MSC does not know the parameter, and cannot send the SMD-ACK message to the MS-SME since the R_Transaction ID parameter is a mandatory parameter in the IS-136 R-DATA Accept/R-DATA Reject messages.

There are several handoff scenarios in which the current standards do not support delivery of the SMS Delivery Acknowledgement (SMD-ACK) message. The present invention provides a function in the anchor MSC and in a tandem MSC in a tandem handoff scenario which recognizes that the MS-SME has been handed off between the reception of the SMDBACK or the SMS origination message until the reception of the SMS acknowledgement from the MC (or until the SMDBACK acknowledgement in the tandem handoff scenario). If the anchor MSC or the tandem MSC identifies that the MS-SME has moved, then a SMS Delivery Point-to-Point Acknowledgement (SMDPPACK) Invoke message is sent to the new serving MSC.

The present invention introduces the SMDPPACK message in the intersystem messages between the anchor MSC and subsequent serving MSCs to allow the acknowledgement message to be delivered forward to the originating MS-SME. The SMDPPACK message includes a SMS_Transaction ID (SMSTID) parameter which includes the same information as the R-Transaction ID parameter of the IS-136 SMS Origination (SMD-REQ) message. The SMS-TID parameter enables the new serving MSC to deliver the SMD-ACK message if the MS-SME moves into the new serving MSC.

The present invention also places the SMSTID parameter in the intersystem messages between the initial serving MSC and the anchor MSC. This enables the anchor MSC to deliver the SMD-ACK message if the MS-SME moves back into the anchor MSC. The SMSTID parameter is added as an optional parameter to the SMS Delivery Backward (SMDBACK) Invoke message to enable the anchor MSC to deliver the SMD-ACK message to an MS-SME that has been handed off back to the anchor MSC after it initiated an SMS origination in an initial serving MSC.

Figure 3:
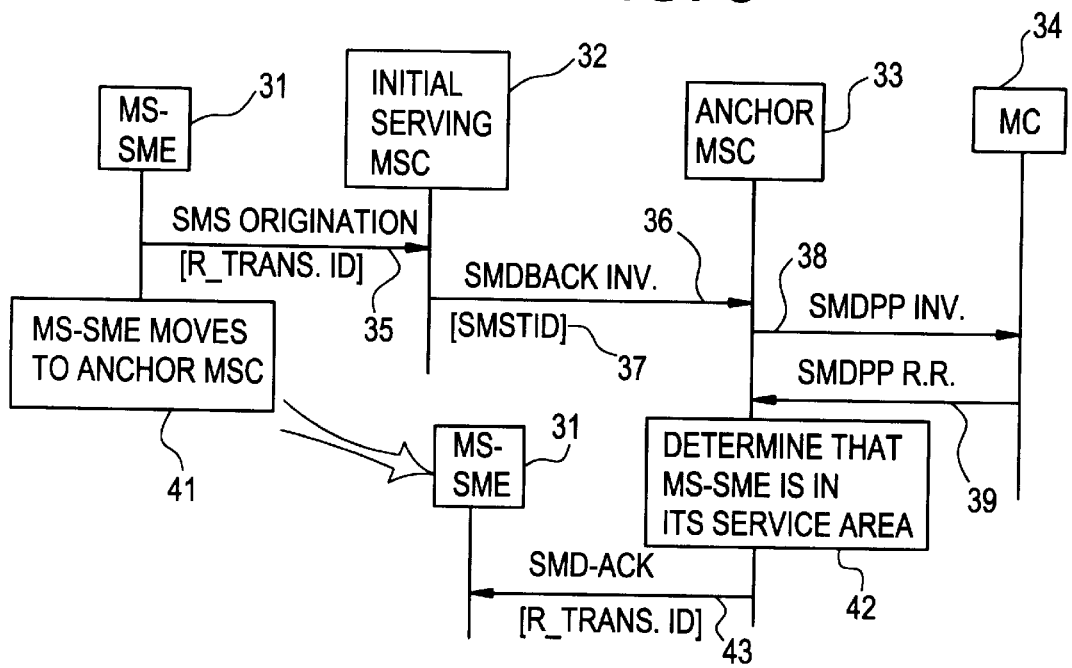
FIG. 3 is a message flow diagram illustrating the flow of messages in the present invention when a MS-SME originates a SMS message in an initial serving MSC and subsequently moves into an anchor MSC before a SMS acknowledgement message can be received in the initial serving MSC.

FIG. 3 is a message flow diagram illustrating the flow of messages in the present invention when a MS-SME 31 originates a SMS message in an initial serving MSC 32 and subsequently moves into an anchor MSC 33 before a SMS acknowledgement message can be received in the initial serving MSC from a message center (MC) 34. The MS-SME first sends a SMS Origination message 35 over the IS-136 DTC to the initial serving MSC 32. The SMS Origination message includes the R_Transaction ID parameter. The initial serving MSC sends a SMDBACK Invoke message 36 to the anchor MSC 33 for the MS-SME. The SMDBACK Invoke message includes a new intersystem message parameter, the SMS_Transaction ID (SMSTID) parameter 37. The SMSTID parameter 37 includes the same information as the IS-136 R_Transaction ID parameter, and enables the anchor MSC to deliver the SMS acknowledgement message to the MS-SME 31 in case of a handoff back to the anchor MSC. The SMSTID parameter is added as an optional parameter to the SMDBACK Invoke message to enable the MS-SME to correlate the SMS origination message with the acknowledgement message when the MS-SME has been handed off after it initiated an SMS origination. The example illustrated in FIG. 3 utilizes ANSI-41 signaling messages, but the present invention is not limited to this specific intersystem protocol. ANSI-41 is hereby incorporated by reference herein.

Following the receipt of the SMDBACK Invoke message 36 in the anchor MSC 33, the anchor MSC then sends a SMDPP Invoke message 38 to the MC 34, and the MC returns a SMDPP Return Result message 39 to the anchor MSC. At 41, the illustrated scenario assumes that the MS-SME 31 moves into the operating area of the anchor MSC 33 after sending the SMS Origination message 35. At 42, the anchor MSC determines that the MS-SME is in its service area, and therefore, instead of sending a SMDBACK Return Result message to the initial serving MSC, the anchor MSC sends a SMD-ACK message 43 directly to the MS-SME 31 over the DTC. The SMD-ACK message includes the IS-136 R_Transaction ID parameter which is a mandatory parameter in IS-136 R-DATA Accept/R-DATA Reject messages. The anchor MSC acquires the information for the R_Transaction ID parameter from the SMSTID parameter 37. The MS-SME then utilizes the R_Transaction ID parameter to correlate the SMS acknowledgement message with the SMS origination message. When the MS-SME performs a handoff back to the anchor MSC, the link to the serving MSC is completely removed. Therefore, no response is sent to the SMDBACK Invoke message 36.

Figure 4:
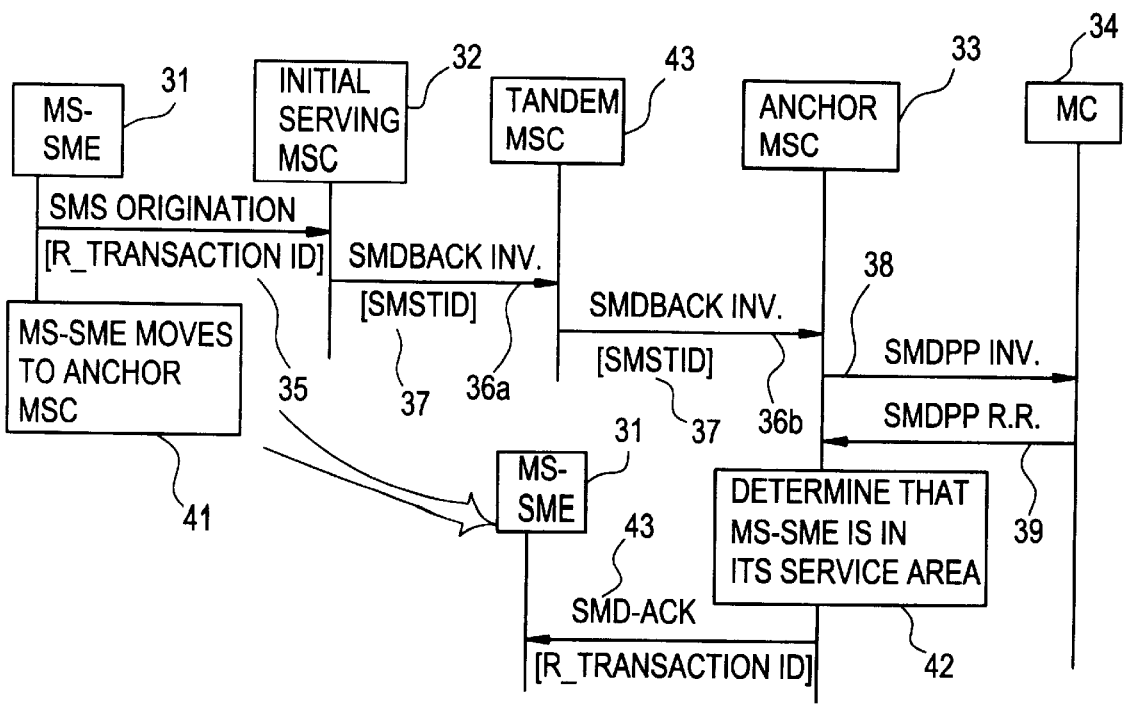
FIG. 4 is a message flow diagram illustrating the flow of messages in the present invention when a MS-SME originates a SMS message in an initial serving MSC and subsequently moves through a tandem MSC into an anchor MSC before a SMS acknowledgement message can be received in the initial serving MSC.

FIG. 4 is a message flow diagram illustrating the flow of messages in the present invention when the MS-SME 31 originates a SMS message in the initial serving MSC 32 and subsequently moves through a tandem MSC 43 into the anchor MSC 33 before a SMS acknowledgement message can be received in the initial serving MSC. The message flow is essentially the same as the flow for the scenario illustrated in FIG. 3, except that a SMDBACK Invoke message 36a (including the SMSTID parameter) is first sent to the tandem MSC 43. The tandem MSC then forwards a SMDBACK Invoke message 36b to the anchor MSC 33. The remainder of the message flow is identical, with the anchor MSC utilizing the information from the SMSTID parameter to send a SMD-ACK message 43 directly to the MS-SME 31 over the DTC.

FIG. 5 is a table of parameters illustrating the parameters of the SMS Delivery Backward (SMDBACK) Invoke message 36 modified in accordance with the teachings of the present invention. The table illustrates the addition of the optional SMS_Transaction ID (SMSTID) parameter 37. The SMSTID parameter is included in the SMDBACK Invoke message to identify an SMS origination initiated by a MS-SME that has been handed off after it initiated the SMS origination.

FIG. 6 is a table illustrating the information bits in the SMS_Transaction ID (SMSTID) parameter 37. The SMS-TID parameter is illustrated to be one octet in length, but may be longer if required. The information carried is defined in the relevant air interface standards (for example, IS-136) which are hereby incorporated by reference herein. The SMSTID parameter identifies an SMS transaction originated by a MS-SME.

Figure 7:
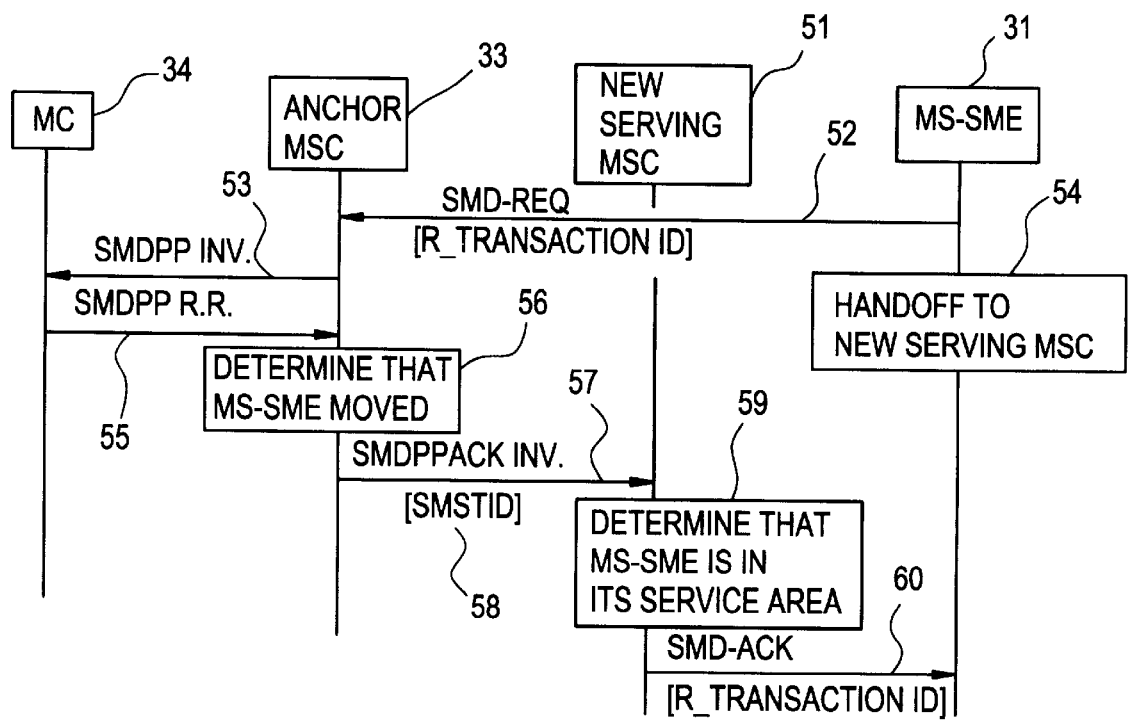
FIG. 7 is a message flow diagram illustrating the flow of messages in the present invention when a MS-SME originates a SMS message in an anchor MSC and subsequently moves into a new serving MSC before a SMS acknowledgement message can be received in the anchor MSC.

FIG. 7 is a message flow diagram illustrating the flow of messages in the present invention when a MS-SME 31 originates a SMS message in an anchor MSC 33 and subsequently moves into a new serving MSC 51 before a SMS acknowledgement message can be received in the anchor MSC from a message center (MC) 34. The MS-SME first sends a SMS Origination (SMD-REQ) message 52 over the IS-136 air interface radio link (Digital Traffic Channel) to the anchor MSC 33. The SMS Origination message includes the R_Transaction ID parameter. The anchor MSC then sends a SMDPP Invoke message 53 to the MC 34. In the illustrated scenario, the MS-SME is then handed off to the new serving MSC at 54. The MC then returns a SMDPP Return Result (acknowledgement) message 55 to the anchor MSC. At 56, the anchor MSC determines that the MS-SME has moved to the new serving MSC 51.

At this point, there is no existing intersystem message to pass the Transaction ID to the new serving MSC for delivery of the SMS Acknowledgement message. Therefore, the present invention introduces a new SMS Delivery Point-to-Point Acknowledgement (SMDPPACK) Invoke message 57 which performs this function. The information from the R_Transaction ID parameter is placed in the SMS_Transaction ID (SMSTID) parameter 58 and passed to the new serving MSC in the SMDPPACK Invoke message. The new serving MSC then determines that the MS-SME is in its service area at 59. The new serving MSC then delivers a SMD-ACK message 60 to the MS-SME. The parameters of the SMDPPACK Invoke message 57 are shown in FIG. 11.

Figure 8:
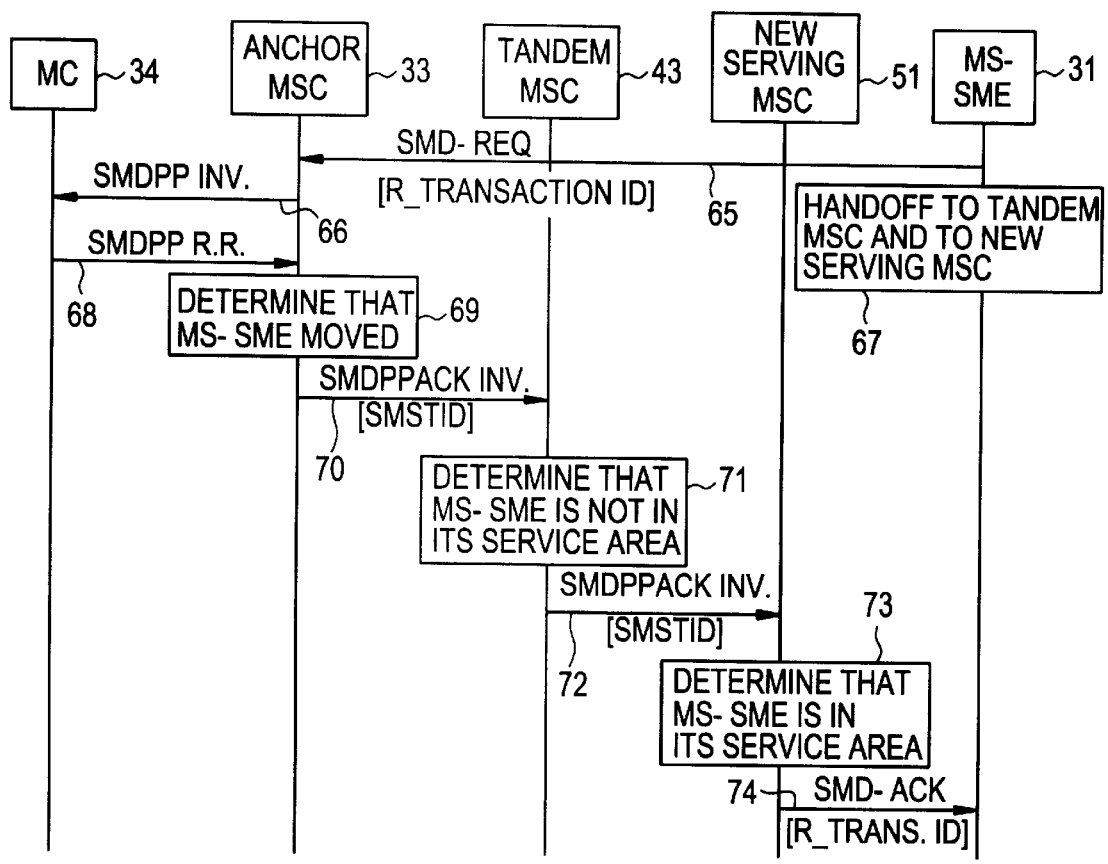
FIG. 8 is a message flow diagram illustrating the flow of messages in the present invention when the MS-SME originates a SMS message in the anchor MSC and subsequently moves through a tandem MSC into the new serving MSC before a SMS acknowledgement message can be received in the anchor MSC.

FIG. 8 is a message flow diagram illustrating the flow of messages in the present invention when the MS-SME 31 originates a SMS message in the anchor MSC 33 and subsequently moves through a tandem MSC 43 into the new serving MSC 51 before a SMS acknowledgement message can be received in the anchor MSC. The MS-SME first sends a SMS Origination (SMD-REQ) message 65 over the IS-136 air interface radio link (DTC) to the anchor MSC 33. The SMS Origination message includes the R_Transaction ID parameter. The anchor MSC then sends a SMDPP Invoke message 66 to the MC 34. In the illustrated scenario, the MS-SME is then handed off at 67 to the tandem MSC 43 and then to the new serving MSC 51. The MC then returns a SMDPP Return Result acknowledgement message 68 to the anchor MSC. At 69, the anchor MSC determines that the MS-SME has moved to the tandem MSC 43.

The anchor MSC 33 then sends a SMDPPACK Invoke message 70 to the tandem MSC 43 and includes the SMSTID parameter. The tandem MSC determines at 71 at the MS-SME is not in its service area, but has moved to the new serving MSC 51. Therefore, the tandem MSC sends a SMDPPACK Invoke message 72 to the new serving MSC and includes the SMSTID parameter. The new serving MSC determines at 73 that the MS-SME is in its service area, and therefore utilizes the information from the SMSTID parameter to send a SMD-ACK message 74 to the MS-SME 31.

Figure 9:
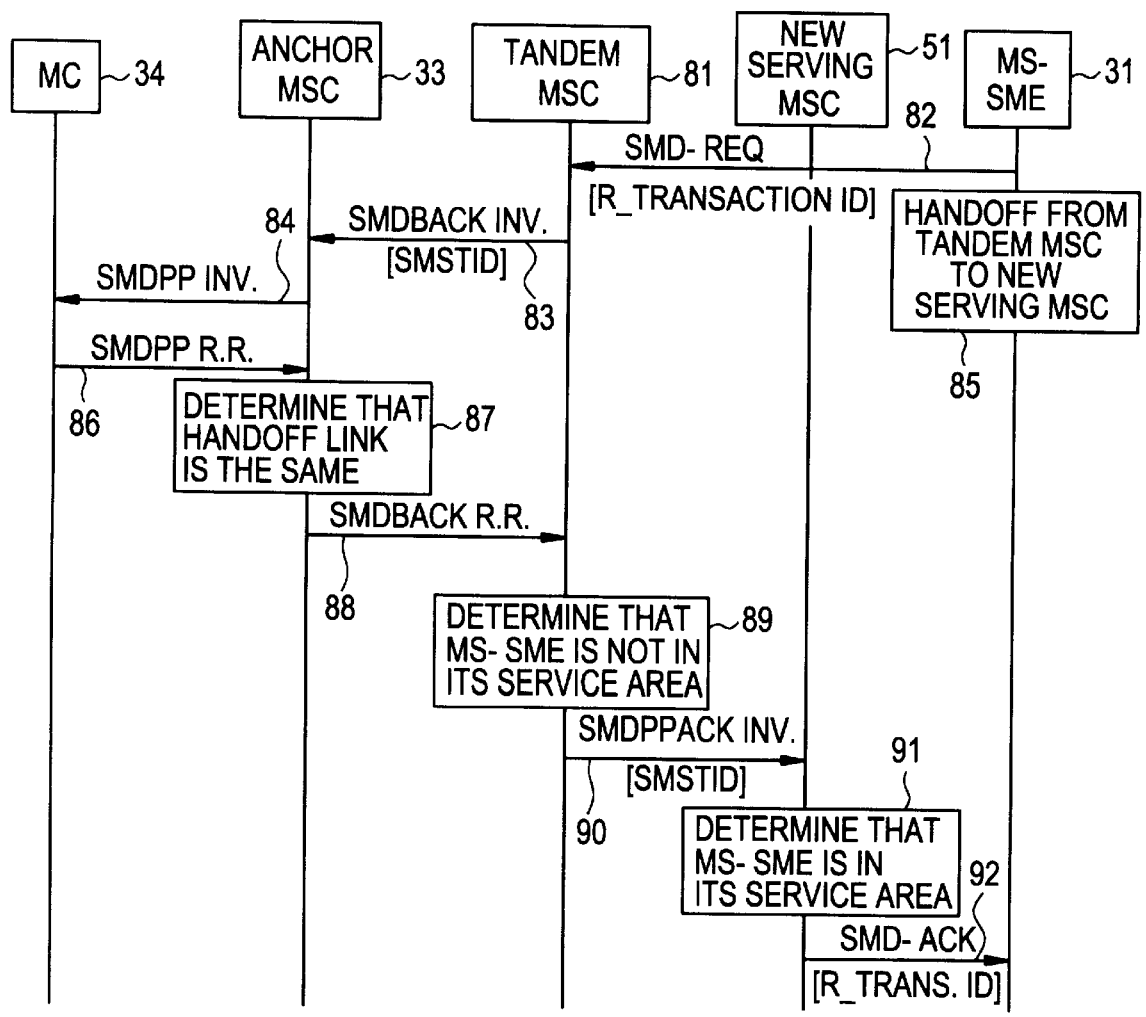
FIG. 9 is a message flow diagram illustrating the flow of messages in the present invention when the MS-SME originates a SMS message in a tandem MSC and subsequently moves into a new serving MSC before a SMS acknowledgement message can be received in the tandem MSC.

FIG. 9 is a message flow diagram illustrating the flow of messages in the present invention when the MS-SME 31 originates a SMS message in a tandem MSC 81 and subsequently moves into a new serving MSC 51 before a SMS acknowledgement message can be received in the tandem MSC. The MS-SME first sends a SMS Origination (SMD-REQ) message 82 over the IS-136 air interface radio link (DTC) to the tandem MSC 81. The SMS Origination message includes the R_Transaction ID parameter. The tandem MSC 81 then sends a modified SMS Delivery Backward (SMDBACK) Invoke message 83 to the anchor MSC and includes the SMSTID parameter. The parameters of the modified SMDBACK Invoke message are shown in FIG. 5. The anchor MSC then sends a SMDPP Invoke message 84 to the MC 34. In the illustrated scenario, the MS-SME is then handed off at 85 from the tandem MSC 81 to the new serving MSC 51. The MC then returns a SMDPP Return Result acknowledgement message 86 to the anchor MSC. Whenever a MS-SME moves from an anchor MSC to another serving MSC, a link is established between the anchor MSC and the new serving MSC. At 87, the anchor MSC determines that the handoff link for the MS-SME has not changed.

The anchor MSC 33 then sends a SMDBACK Return Result message 88 to the tandem MSC 81. The tandem MSC determines at 89 that MS-SME is not in its service area, but has moved to the new serving MSC 51. Therefore, the tandem MSC sends a SMDPPACK Invoke message 90 to the new serving MSC 51 and includes the SMSTID parameter. The tandem MSC received the information for the SMSTID parameter from the R_Transaction ID parameter of the SMD-REQ message 82. The new serving MSC determines at 91 that the MS-SME is in its service area, and therefore utilizes the information from the SMSTID parameter to send a SMD-ACK message 92 to the MS-SME 31.

Figure 10:
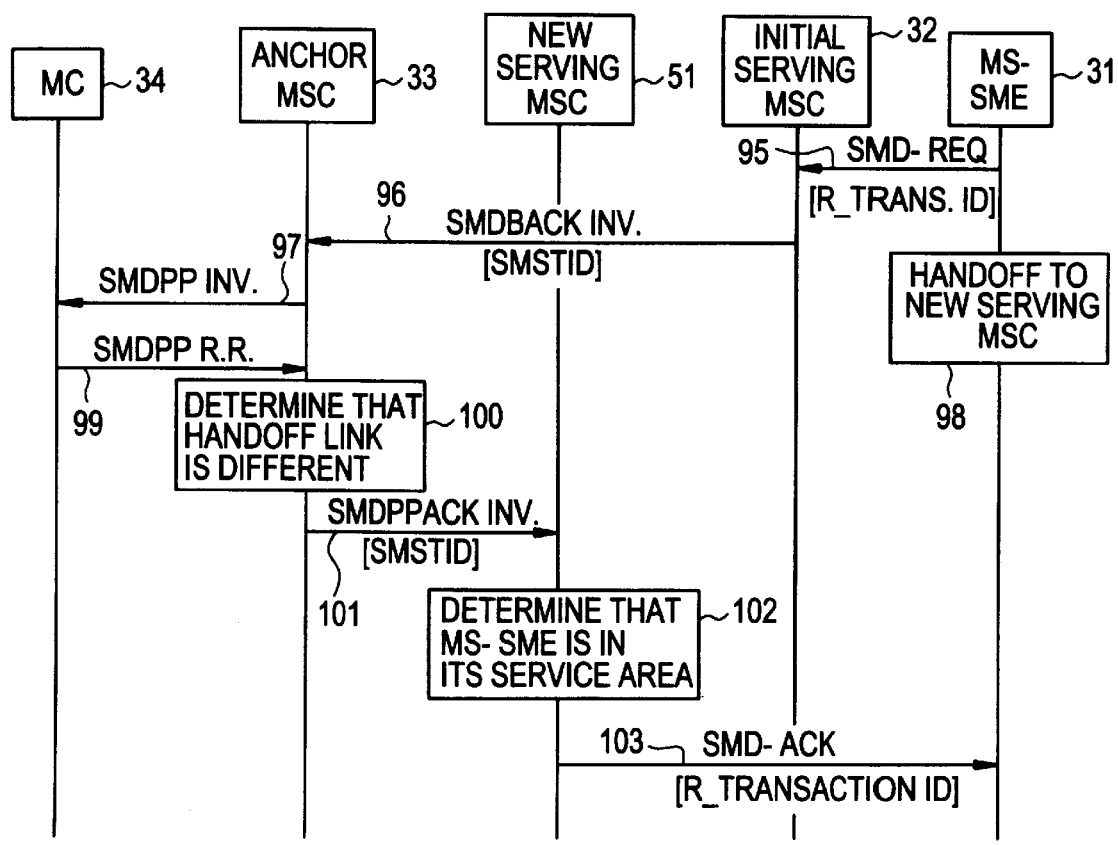
FIG. 10 is a message flow diagram illustrating the flow of messages in the present invention when the MS-SME originates a SMS message in an initial serving MSC and subsequently moves into the new serving MSC before a SMS acknowledgement message can be received in the initial serving MSC.

FIG. 10 is a message flow diagram illustrating the flow of messages in the present invention when the MS-SME 31 originates a SMS message in an initial serving MSC 32 and subsequently moves into the new serving MSC 51 before a SMS acknowledgement message can be received in the initial serving MSC. In this "Handoff to Third" scenario, the MS-SME first sends a SMS Origination (SMD-REQ) message 95 over the IS-136 DTC to the initial serving MSC 32. The SMS Origination message includes the R_Transaction ID parameter. The initial serving MSC then sends a SMS Delivery Backward (SMDBACK) Invoke message 96 to the anchor MSC 33 and includes the SMSTID parameter. The anchor MSC then sends a SMDPP Invoke message 97 to the MC 34. At 98, the illustrated scenario assumes that the MS-SME 31 moves from the initial serving MSC 32 into the service area of the new serving MSC 51 after sending the SMS Origination message 95. The MC then returns a SMDPP Return Result acknowledgement message 99 to the anchor MSC. At 100, the anchor MSC determines that the handoff link for the MS-SME has changed. Therefore, the anchor MSC sends a SMDPPACK Invoke message 101 to the new serving MSC 51 and includes the SMSTID parameter.

The new serving MSC 51 then determines at 102 that the MS-SME is in its service area. Therefore, the new serving MSC utilizes the information from the SMSTID parameter to send a SMD-ACK message 103 to the MS-SME 31.

FIG. 11 is a table of parameters illustrating the parameters of the SMS Delivery Point-to-Point Acknowledgement (SMDPPACK) Invoke message 57 according to the teachings of the present invention. The table illustrates the optional parameters International Mobile Station Identifier (IMSI), Mobile Identification Number (MIN), SMS_Bearer Data, SMS_Cause Code, and the SMS_Transaction ID (SMSTID) parameter 58. The message includes either an IMSI or a MIN. The SMS_Bearer Data is included for positive acknowledgements, and the SMS_Cause Code is included for negative acknowledgements. The SMSTID parameter is included to enable the MS-SME to correlate the SMS origination message with the acknowledgement message when the MS-SME has been handed off after it initiated an SMS origination.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of handling Short Message Service (SMS) messages in a radio telecommunications network when an originating Mobile Station-based Short Message Entity (MS-SME) sends a SMS origination message on a Digital Traffic Channel (DTC) while operating in a serving Mobile Switching Center (MSC) and then moves into an anchor MSC before the MS-SME receives a SMS acknowledgement message, the method comprising the steps of:

including a message-correlating parameter in an intersystem SMS delivery message sent from the serving MSC to the anchor MSC, the message-correlating parameter enabling the originating MS-SME to correlate the SMS acknowledgement message with the SMS origination message;

determining, by the anchor MSC, that the MS-SME is in the anchor MSC's service area; and sending the SMS acknowledgement message directly from the anchor MSC to the originating MS-SME on the DTC utilizing the information from the message-correlating parameter.

2. The method of handling SMS messages of claim 1 wherein the intersystem SMS delivery message sent from the serving MSC to the anchor MSC is an ANSI-41 message.

3. The method of handling SMS messages of claim 2 wherein the ANSI-41 message is a SMS Delivery Backward Invoke message, and the message-correlating parameter is a SMS_Transaction ID (SMSTID) parameter.

4. The method of handling SMS messages of claim 3 wherein the SMSTID parameter is included in the SMS Delivery Backward Invoke message as an optional parameter to enable the MS-SME to correlate the SMS origination message with the acknowledgement message when the MS-SME has been handed off after it initiated the SMS origination.

5. The method of handling SMS messages of claim 1 further comprising, before the step of including the message-correlating parameter in the intersystem SMS delivery message sent from the serving MSC to the anchor MSC, the step of including a radio message-correlating parameter in the SMS origination message sent from the originating MS-SME to the serving MSC on the air interface radio link.

6. The method of handling SMS messages of claim 5 wherein the SMS origination message is sent from the originating MS-SME to the serving MSC on a Digital Traffic Channel (DTC), and the radio message-correlating parameter is an IS-136 R_Transaction ID parameter.

7. The method of handling SMS messages of claim 1 further comprising, after the step of including the message-correlating parameter in the intersystem SMS delivery message sent from the serving MSC to the anchor MSC, the steps of:

sending a SMS Delivery Point-to-Point (SMDPP) Invoke message from the anchor MSC to a message center (MC); and sending the SMS acknowledgement message from the MC to the anchor MSC in response to the SMDPP Invoke message.

8. A method of handling Short Message Service (SMS) messages in a radio telecommunications network when an originating Mobile Station-based Short Message Entity (MS-SME) sends a SMS origination message on a Digital Traffic Channel (DTC) while operating in a serving Mobile Switching Center (MSC) and then moves into an anchor MSC before the MS-SME receives a SMS acknowledgement message, the method comprising the steps of:

including a radio message-correlating parameter in the SMS origination message sent from the originating MS-SME to the serving MSC;

including a message-correlating parameter in an intersystem SMS delivery message sent from the serving MSC to the anchor MSC, the message-correlating parameter utilizing information from the radio message-correlating parameter to enable the originating MS-SME to correlate the SMS acknowledgement message with the SMS origination message;

sending a SMS Delivery Point-to-Point (SMDPP) Invoke message from the anchor MSC to a message center (MC);

sending the SMS acknowledgement message from the MC to the anchor MSC in response to the SMDPP Invoke message; and determining, by the anchor MSC, that the MS-SME is in the anchor MSC's service area; and sending the SMS acknowledgement message directly from the anchor MSC to the originating MS-SME on the DTC utilizing the information from the message-correlating parameter.

9. The method of handling SMS messages of claim 8 wherein the radio message-correlating parameter is an IS-136 R_Transaction ID parameter.

10. The method of handling SMS messages of claim 9 wherein the intersystem SMS delivery message sent from the serving MSC to the anchor MSC is an ANSI-41 SMS Delivery Backward Invoke message, and the message-correlating parameter is a SMS_Transaction ID (SMSTID) parameter.

11. A method of handling Short Message Service (SMS) messages in a radio telecommunications network when an originating Mobile Station-based Short Message Entity (MS-SME) sends a SMS origination message on a Digital Traffic Channel (DTC) while operating in an initial serving Mobile Switching Center (MSC) and then moves through a tandem MSC into an anchor MSC before the MS-SME receives a SMS acknowledgement message, the method comprising the steps of:

including a message-correlating parameter in an intersystem SMS delivery message sent from the initial serving MSC to the tandem MSC, the message-correlating parameter enabling the originating MS-SME to correlate the SMS acknowledgement message with the SMS origination message;

including the message-correlating parameter in an intersystem SMS delivery message sent from the tandem MSC to the anchor MSC;

determining, by the anchor MSC, that the MS-SME is in the anchor MSC's service area; and sending the SMS acknowledgement message directly from the anchor MSC to the originating MS-SME over an air interface radio link utilizing the information from the message-correlating parameter.

12. The method of handling SMS messages of claim 11 further comprising, before the step of including a message-correlating parameter in an intersystem SMS delivery message, the steps of:

including a radio message-correlating parameter in the SMS origination message sent from the originating MS-SME to the serving MSC; and utilizing information from the radio message-correlating parameter to create the message-correlating parameter.

13. A method of delivering a Short Message Service (SMS) acknowledgement message to an originating Mobile Station-based Short Message Entity (MS-SME) in a radio telecommunications network having a serving Mobile Switching Center (MSC), an anchor MSC, and a SMS Message Center (MC), when the originating MS-SME sends a SMS origination message on a Digital Traffic Channel (DTC) while operating in the anchor MSC and then moves into the serving MSC before the originating MS-SME receives the SMS acknowledgement message from the MC, the method comprising the steps of:

determining in the anchor MSC that the MS-SME has moved to the serving MSC;

obtaining by the anchor MSC, the SMS acknowledgement message from the MC;

including a message-correlating parameter in an intersystem SMS acknowledgement delivery message sent from the anchor MSC to the serving MSC, the message-correlating parameter including information enabling the originating MS-SME to correlate the SMS acknowledgement message with the SMS origination message;

determining, by the serving MSC, that the MS-SME is in the serving MSC's service area; and sending the SMS acknowledgement message directly from the serving MSC to the originating MS-SME on the DTC utilizing the information from the message-correlating parameter.

14. The method of delivering a SMS acknowledgement message to an originating MS-SME of claim 13 wherein the intersystem SMS acknowledgement delivery message sent from the anchor MSC to the serving MSC is an ANSI-41 message.

15. The method of delivering a SMS acknowledgement message to an originating MS-SME of claim 14 wherein the ANSI-41 message is a SMS Delivery Point-to-Point Acknowledgement (SMDPPACK) Invoke message, and the message-correlating parameter is a SMS_Transaction ID (SMSTID) parameter.

16. The method of delivering a SMS acknowledgement message to an originating MS-SME of claim 15 wherein the SMSTID parameter is included in the SMDPPACK Invoke message as an optional parameter to enable the MS-SME to correlate the SMS origination message with the acknowledgement message when the MS-SME has been handed off after it initiated the SMS origination.

17. The method of delivering a SMS acknowledgement message to an originating MS-SME of claim 13 wherein the step of obtaining by the anchor MSC, the SMS acknowledgement message from the MC includes the steps of:

sending a SMS Delivery Point-to-Point (SMDPP) Invoke message from the anchor MSC to the MC; and sending the SMS acknowledgement message from the MC to the anchor MSC in response to the SMDPP Invoke message.

18. The method of delivering a SMS acknowledgement message to an originating MS-SME of claim 13 further comprising, before the step of including the message-correlating parameter in the intersystem SMS acknowledgement delivery message sent from the anchor MSC to the serving MSC, the step of including a radio message-correlating parameter in the SMS origination message sent from the originating MS-SME to the anchor MSC.

19. The method of delivering a SMS acknowledgement message to an originating MS-SME of claim 18 wherein the step of including a message-correlating parameter in an intersystem SMS acknowledgement delivery message sent from the anchor MSC to the serving MSC includes mapping the identifying information from the radio message-correlating parameter in the SMS origination message to the message-correlating parameter in the intersystem SMS acknowledgement delivery message.

20. A method of delivering a Short Message Service (SMS) acknowledgement message to an originating Mobile Station-based Short Message Entity (MS-SME) in a radio telecommunications network having a serving Mobile Switching Center (MSC), an anchor MSC, a tandem MSC, and a SMS Message Center (MC), when the originating MS-SME sends a SMS origination message on a Digital Traffic Channel (DTC) while operating in the anchor MSC and then moves through the tandem MSC into the serving MSC before the originating MS-SME receives the SMS acknowledgement message from the MC, the method comprising the steps of:

including a radio message-correlating parameter in the SMS origination message sent from the originating MS-SME to the anchor MSC, the radio message-correlating parameter including information enabling the originating MS-SME to correlate the SMS acknowledgement message with the SMS origination message;

determining in the anchor MSC that the MS-SME moved to the tandem MSC;

obtaining by the anchor MSC, the SMS acknowledgement message from the MC;

including a message-correlating parameter in a first intersystem SMS acknowledgement delivery message sent from the anchor MSC to the tandem MSC, the message-correlating parameter including information from the radio message-correlating parameter;

determining in the tandem MSC that the MS-SME is not in the tandem MSC's service area;

sending a second intersystem SMS acknowledgement delivery message from the tandem MSC to the serving MSC, the second intersystem SMS acknowledgement delivery message including the message-correlating parameter;

determining in the serving MSC that the MS-SME is in the serving MSC's service area; and sending the SMS acknowledgement message directly from the serving MSC to the originating MS-SME over the DTC utilizing the information from the message-correlating parameter.

21. A method of delivering a Short Message Service (SMS) acknowledgement message to an originating Mobile Station-based Short Message Entity (MS-SME) in a radio telecommunications network having an tandem Mobile Switching Center (MSC), an anchor MSC, a new serving MSC, and a SMS Message Center (MC), when the originating MS-SME sends a SMS origination message on a Digital Traffic Channel (DTC) while operating in the tandem MSC and then moves into the new serving MSC before the originating MS-SME receives the SMS acknowledgement message from the MC, the method comprising the steps of:

including a radio message-correlating parameter in the SMS origination message sent from the originating MS-SME to the tandem MSC, the radio message-correlating parameter including information enabling the originating MS-SME to correlate the SMS acknowledgement message with the SMS origination message;

including a message-correlating parameter in a intersystem SMS delivery message sent from the tandem MSC to the anchor MSC, the message-correlating parameter including information from the radio message-correlating parameter;

determining in the anchor MSC that a handoff link for the MS-SME has not changed;

obtaining by the anchor MSC, the SMS acknowledgement message from the MC;

sending a intersystem SMS acknowledgement delivery message from the anchor MSC to the tandem MSC;

determining in the tandem MSC that the MS-SME is not in the tandem MSC's service area;

sending a second intersystem SMS acknowledgement delivery message from the tandem MSC to the new serving MSC, the second intersystem SMS acknowledgement delivery message including the message-correlating parameter;

determining in the new serving MSC that the MS-SME is in the new serving MSC's service area; and sending the SMS acknowledgement message directly from the new serving MSC to the originating MS-SME over the DTC utilizing the information from the message-correlating parameter.

22. A method of delivering a Short Message Service (SMS) acknowledgement message to an originating Mobile Station-based Short Message Entity (MS-SME) in a radio telecommunications network having an initial serving Mobile Switching Center (MSC), an anchor MSC, a new serving MSC, and a SMS Message Center (MC), when the originating MS-SME sends a SMS origination message on a Digital Traffic Channel (DTC) while operating in the initial serving MSC and then moves into the new serving MSC before the originating MS-SME receives the SMS acknowledgement message from the MC, the method comprising the steps of:

including a radio message-correlating parameter in the SMS origination message sent from the originating MS-SME to the initial serving MSC, the radio message-correlating parameter including information enabling the originating MS-SME to correlate the SMS acknowledgement message with the SMS origination message;

including a message-correlating parameter in a intersystem SMS delivery message sent from the initial serving MSC to the anchor MSC, the message-correlating parameter including information from the radio message-correlating parameter;

determining in the anchor MSC that a handoff link for the MS-SME has changed;

obtaining by the anchor MSC, the SMS acknowledgement message from the MC;

sending a intersystem SMS acknowledgement delivery message from the anchor MSC to the new serving MSC, the intersystem SMS acknowledgement delivery message including the message-correlating parameter;

determining in the new serving MSC that the MS-SME is in the new serving MSC's service area; and sending the SMS acknowledgement message directly from the new serving MSC to the originating MS-SME over the DTC utilizing the information from the message-correlating parameter.

* * * * *